United States Patent
Piel

(10) Patent No.: US 11,461,854 B2
(45) Date of Patent: Oct. 4, 2022

(54) SYSTEMS AND METHODS FOR USING MULTI-FACTOR AUTHENTICATION FOR TAX FILINGS

(71) Applicant: MASTERCARD INTERNATIONAL INCORPORATED, Purchase, NY (US)

(72) Inventor: Brian Piel, Ballwin, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 975 days.

(21) Appl. No.: 15/802,907

(22) Filed: Nov. 3, 2017

(65) Prior Publication Data
US 2019/0139148 A1  May 9, 2019

(51) Int. Cl.
*G06Q 40/00* (2012.01)
*G06Q 20/40* (2012.01)
*H04W 12/06* (2021.01)

(52) U.S. Cl.
CPC .......... *G06Q 40/123* (2013.12); *G06Q 20/40* (2013.01); *H04W 12/06* (2013.01); *H04L 2463/082* (2013.01)

(58) Field of Classification Search
None
See application file for complete search history.

(56) References Cited

U.S. PATENT DOCUMENTS

| | | |
|---|---|---|
| 6,681,214 B1 | 1/2004 | Doljack |
| 7,603,301 B1 | 10/2009 | Regan |
| 9,122,866 B1* | 9/2015 | Kolman ................ G06F 21/46 |
| 2003/0069793 A1 | 4/2003 | Rudolph et al. |
| 2005/0165684 A1* | 7/2005 | Jensen ............ G06Q 20/40145 |
| | | 705/44 |
| 2008/0005024 A1 | 1/2008 | Kirkwood |
| 2014/0244456 A1 | 8/2014 | Huang et al. |
| 2015/0052033 A1 | 2/2015 | Boyanov et al. |
| 2015/0213551 A1 | 7/2015 | Boyanov et al. |
| 2016/0063645 A1* | 3/2016 | Houseworth ........ G06Q 50/265 |
| | | 705/31 |
| 2016/0180484 A1 | 6/2016 | Roebuck |
| 2017/0301034 A1 | 10/2017 | Golasz |
| 2017/0318000 A1 | 11/2017 | Louis et al. |

* cited by examiner

*Primary Examiner* — John W Hayes
*Assistant Examiner* — Ari Shahabi
(74) *Attorney, Agent, or Firm* — Armstrong Teasdale LLP

(57) ABSTRACT

An authentication computing device stores a cardholder profile that is associated with a candidate cardholder and includes a cardholder identifier, a device identifier, payment account data, and trusted authentication data in a database system, receives an authentication request that is associated with a tax filing of the candidate cardholder and includes a filing identifier from a revenue computing device, detects the authentication request is associated with the candidate cardholder based upon the filing identifier and the cardholder profile, transmits an identity challenge requesting authentication data associated with the candidate cardholder to a user device associated with the device identifier, receives a challenge response including response authentication data from the user device, determines an authentication status associated with the authentication request based on a comparison of the response authentication data and the trusted authentication data, and transmits the authentication status to the revenue computing device.

24 Claims, 7 Drawing Sheets us 11,461,854 B2

SYSTEMS AND METHODS FOR USING MULTI-FACTOR AUTHENTICATION FOR TAX FILINGS

BACKGROUND

The field of the present disclosure relates generally to authentication, and more specifically, to network-based systems and methods configured to authenticate users performing tax filings using multi-factor authentication.

Business entities, families, and individuals (sometimes collectively referred to herein as "taxable entities") are typically required to pay taxes on property, income, and the like. Periodically, the taxable entities may report their income, property, and other tax-related information (e.g., charitable donations, tax credits, etc.) to a revenue authority that manages the tax collection to determine whether or not the taxable entities are properly paying their taxes. The taxable entities report the tax-related information by filling out one or more forms and submitting the forms to the revenue authority. At least some tax reporting systems enable the taxable entities to provide the tax-related information to a web interface or application that populates the forms for submittal to the revenue authority.

These known tax reporting systems with digital interfaces may be targeted by fraudulent parties. More specifically, the sensitive information (e.g., Social Security number, bank account information, etc.) stored by the taxable entities at the tax reporting systems may be targeted for identity theft. Moreover, the fraudulent party may impersonate the taxable entity by filing the tax forms with the revenue authority and collecting a subsequent tax return intended for the taxable entity. As a result, the taxable entity is unable to collect their tax return. Some systems enable the taxable entity to report the suspected fraudulent activity to seek reimbursement, but the process may be time and resource intensive, thereby increasing the inconvenience experienced by the taxable entity. Although at least some tax reporting systems have password security built into the digital interface to reduce the risk of fraud, knowledgeable fraudulent parties may be able to deceive the digital interface to gain access to the tax forms of a taxable entity without the knowledge of the taxable entity.

BRIEF DESCRIPTION

In one aspect, an authentication computing device includes at least one processor and a memory in communication with the processor. The processor is programmed to store a cardholder profile that is associated with a candidate cardholder and includes a cardholder identifier, a device identifier, payment account data, and trusted authentication data associated with the candidate cardholder in a database system, receive an authentication request that is associated with a tax filing of the candidate cardholder and includes a filing identifier from a revenue computing device, detect the authentication request is associated with the candidate cardholder based at least partially upon the filing identifier and the cardholder profile, transmit an identity challenge requesting authentication data associated with the candidate cardholder for the tax filing to a user device associated with the device identifier of the cardholder profile, receive a challenge response including response authentication data from the user device, determine an authentication status associated with the authentication request based at least partially on a comparison of the response authentication data and the trusted authentication data of the cardholder profile, and transmit the authentication status to the revenue computing device. The revenue computing device determines whether the tax filing is fraudulent based at least in part on the authentication status.

In another aspect, a method for authenticating a tax filing associated with a candidate cardholder is provided. The method is at least partially performed by an authentication computing device. The method includes storing a cardholder profile that is associated with a candidate cardholder and includes a cardholder identifier, a device identifier, payment account data, and trusted authentication data associated with the candidate cardholder in a database system, receiving an authentication request that is associated with a tax filing of the candidate cardholder and includes a filing identifier from a revenue computing device, detecting the authentication request is associated with the candidate cardholder based at least partially upon the filing identifier and the cardholder profile, transmitting an identity challenge requesting authentication data associated with the candidate cardholder for the tax filing to a user device associated with the device identifier of the cardholder profile, receiving a challenge response including response authentication data from the user device, determining an authentication status associated with the authentication request based at least partially on a comparison of the response authentication data and the trusted authentication data of the cardholder profile, and transmitting the authentication status to the revenue computing device. The revenue computing device determines whether the tax filing is fraudulent based at least in part on the authentication status.

In yet another aspect, at least one non-transitory computer-readable storage media having computer-executable instructions embodied thereon is provided. When executed by at least one processor, the computer-executable instructions cause the processor to store a cardholder profile that is associated with a candidate cardholder and includes a cardholder identifier, a device identifier, payment account data, and trusted authentication data associated with the candidate cardholder in a database system, receive an authentication request that is associated with a tax filing of the candidate cardholder and includes a filing identifier from a revenue computing device, detect the authentication request is associated with the candidate cardholder based at least partially upon the filing identifier and the cardholder profile, transmit an identity challenge requesting authentication data associated with the candidate cardholder for the tax filing to a user device associated with the device identifier of the cardholder profile, receive a challenge response including response authentication data from the user device, determine an authentication status associated with the authentication request based at least partially on a comparison of the response authentication data and the trusted authentication data of the cardholder profile, and transmit the authentication status to the revenue computing device. The revenue computing device determines whether the tax filing is fraudulent based at least in part on the authentication status.

BRIEF DESCRIPTION OF THE DRAWINGS

FIGS. 1-6 show example embodiments of the methods and systems described herein.

FIG. 1 is a schematic diagram illustrating an example tax authentication (TA) system for authenticating tax filings in accordance with one embodiment of the disclosure.

FIG. 3 is an expanded block diagram of an example embodiment of a remote device for use in the system shown in FIG. 1.

FIG. 4 illustrates an example configuration of a host system for use in the system shown in FIG. 1.

FIG. 5 is a flowchart of an example process for authenticating a tax filing using the system shown in FIG. 1.

FIG. 6 is a diagram of components of one or more example computing devices that may be used in embodiments of the described systems and methods.

DETAILED DESCRIPTION

Figure 1:
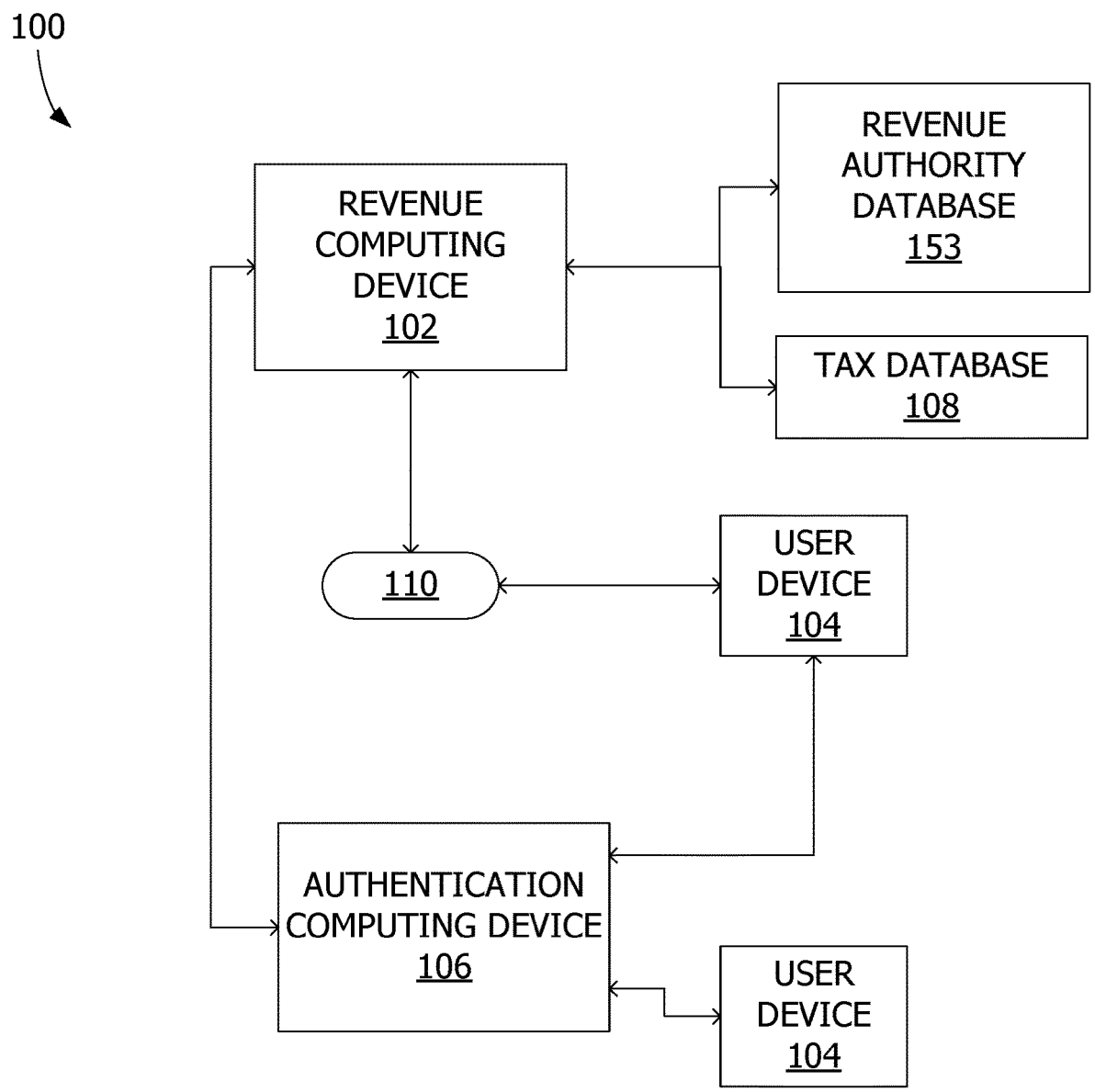

Systems and method according to this disclosure are directed to authentication, and more specifically, to network-based systems and methods configured to authenticate users making tax filings using multi-factor authentication.

In the example embodiment, a tax authentication (TA) system is a system configured to provide multi-factor authentication for tax filings. As used herein, a "tax filing" refers to an account, profile, tax-related information, and/or tax forms associated with a process for reporting the taxes of a taxable entity to a revenue authority that manages the taxes applied to the taxable entities. In the example embodiment, a taxable entity registers for tax filings with a revenue computing device. The revenue computing device is associated with the revenue authority and/or a third party that is in communication with the revenue authority. The revenue computing device is configured to store tax filings in a tax database organized by the taxable entity. The tax filings may include one or more predefined data structures to store the information and files associated with the tax filing together to enable efficient retrieval of the tax filing. The revenue computing device is further configured to provide a tax interface that enables taxable entities to access their respective tax filings. The tax interface may be a web interface, an application interface (i.e., an application associated with the revenue computing device is stored on computing devices associated with taxable entities), and the like. Through the tax interface, the taxable entities provide tax-related information and perform actions associated with the tax filing, such as submit the tax filing for review by the revenue authority. The taxable entity may also provide payment information for the tax filing to pay any fees associated with the tax filing and/or to identify a payment account for receiving a monetary tax return. In at least some embodiments, to limit or otherwise prevent fraudulent access to the tax filings, the revenue computing device may perform an authentication process for each user attempting to access or perform an action with a tax filing.

In the example embodiment, the revenue computing device is communicatively coupled to an authentication computing device. The authentication computing device is configured to execute at least a portion of the authentication process to determine if a user is the authentic user associated with a tax filing or a potentially fraudulent user. That is, the authentication computing device stores trusted or verified authentication data associated with a user and compares the trusted authentication data to subsequent authentication data.

In the example embodiment, the authentication computing device is communicatively coupled to a payment processing network that processes payment transactions to provide an authentication service for the payment transactions. In particular, the authentication computing device may be configured to provide the authentication service for transactions involving payment cards (e.g., debit cards, credit cards, gift cards, etc.) including both card-present transactions and card-not-present transactions (e.g., web-based transactions using the account information on the payment card). When a payment transaction is initiated and submitted to the payment processing network, the authentication computing device is configured to authenticate a cardholder of the transaction to prevent fraudulent use of the cardholder's payment account. The authentication computing device requests and analyzes data to determine an authentication status (e.g., "approved" or "decline") of the user initiating the transaction.

The authentication service may be an opt-in service that is provided to cardholders upon receiving permission from the cardholders. In some embodiments, the cardholder is automatically registered for the authentication service when activating a payment account and/or payment card. During registration, the authentication computing device prompts a candidate cardholder to provide information for a cardholder profile. The cardholder profile includes, for example, and without limitation, a cardholder identifier, a device identifier, payment account data, and trusted authentication data. The cardholder identifier indicates a candidate cardholder associated with the cardholder profile. The device identifier is associated with a user device of the candidate cardholder, such as a mobile device (e.g., smartphone, smart watch, wearable electronic, laptop, tablet, etc.). In at least some embodiments, the device identifier includes contact information to enable the authentication computing device to communicate with the user device. The payment account data includes payment information to identify one or more payment accounts associated with the candidate cardholder. The payment information may include, for example, an account identifier (e.g., primary account number (PAN)), an account expiration date, available funds, and the like. The trusted authentication data is data used to authenticate the identity of the candidate cardholder and is presumed to be associated with the candidate cardholder. Authentication data is any suitable data that may represent the identity of a user, such as biometric data (e.g., fingerprints, iris scans, facial images, etc.), device data (e.g., unique identifiers stored by a device, encryption keys, etc.), passwords, PINs, and the like.

The cardholder profile is stored in a database system in communication with the authentication computing device to enable the authentication computing device to extract data elements from received data and compare the extracted data elements to the stored cardholder profiles to identify a candidate cardholder that is associated with the received data.

In the example embodiment, to determine whether or not a user registered with the revenue computing device is enrolled in the authentication service of the authentication computing device, the revenue computing device transmits information associated with the user to the authentication computing device. In particular, the revenue computing device transmits payment information to the authentication computing device for comparison to the stored cardholder profiles. The payment information is information provided to the revenue computing device by the user to facilitate transactions associated with the tax filing. For example, the payment information may include a cardholder identifier and/or a payment account identifier. The payment information is compared to the stored cardholder profile to identify (if any) a matching cardholder. The authentication computing device then notifies the revenue computing device whether or not the user is enrolled in the authentication service. In certain embodiments, the revenue computing device updates stored information associated with the user to indicate the enrollment in the authentication service.

In the example embodiment, when a user (i.e., a taxable entity) enrolled in the authentication service attempts to access the tax filing, make changes to the tax filing, submit the tax filing, and/or receive reimbursement for the tax filing (i.e., a tax return or refund), the revenue computing device may perform an initial authentication process. The initial authentication process may include, for example, prompting the user to provide a username or password associated with the tax filing. The revenue computing device generates a revenue authentication result from the initial authentication process. The revenue authentication result indicates whether or not the user is authenticated. In at least some embodiments, when the revenue authentication result does not indicate the user is authenticated, the revenue computing device prevents the user from access the tax filing. When the revenue authentication result indicates that the user is authenticated, the revenue computing device notifies the authentication computing device to begin the authentication process for multi-factor authentication.

In the example embodiment, the revenue computing device transmits an authentication request to the authentication computing device. The request includes at least a filing identifier associated with the tax filing. The filing identifier may be selected to correspond to at least one data elements stored within a cardholder profile. For example, the filing identifier may be a cardholder identifier (e.g., a name of the cardholder), payment account data, and/or another suitable unique identifier. The authentication computing device is configured to detect the authentication request is associated with a particular candidate cardholder based at least partially upon the filing identifier. That is, the filing identifier is used to query the stored cardholder profiles and identify a cardholder profile associated with the candidate cardholder. In some embodiments, the authentication request may further include a description of the action that prompted the revenue computing device to transmit the authentication request. For example, the authentication request may indicate an attempt to submit the tax filing to the revenue authority.

The authentication computing device is configured to generate an identity challenge for the cardholder. The identity challenge is configured to prompt the cardholder or a user device of the cardholder to provide authentication data for use in verifying that the user attempting to access the tax filing is in fact the cardholder. In particular, the authentication data that the identity challenge is configured to request is based on the trusted authentication data stored in the cardholder profile. That is, if the trusted authentication data is a fingerprint of the candidate cardholder, the identity challenge is generated to request a corresponding fingerprint. In some embodiments, if the cardholder profile includes multiple types of trusted authentication data, the identity challenge may prompt the cardholder to provide multiple forms of authentication data.

The identity challenge is transmitted to a user device of the candidate cardholder based at least partially on the device identifier. The identity challenge may be transmitted as a text message, an email, a device notification, and/or any other suitable form of communication. The identity challenge may indicate to the candidate cardholder what caused the challenge to be sent (e.g., an access attempt associated with the cardholder's tax filing) to enable the cardholder to determine whether the challenge is being sent as a result of a fraudulent activity. In certain embodiments, the identity challenge may request permission data from the candidate cardholder. The permission data indicates whether or not the cardholder identifies the cause of the authentication request as fraudulent or permissible. If the permission data indicates potential fraud, the authentication computing device notifies the revenue computing device to decline or otherwise prevent access to the tax filing.

The identity challenge causes the user device and/or the candidate cardholder to collect authentication data to authenticate the access attempt of the tax filing. Depending upon the type of authentication data requested, the candidate cardholder provides user input including authentication data and/or the user device generates or retrieves the authentication data. In certain embodiments, the identity challenge is processed by an application installed on the user device to generate a notification to the candidate cardholder to provide the authentication data. In one embodiment, the application is associated with a payment account of the candidate cardholder. For example, the application may be associated with a bank or a payment network provider, such as a digital wallet application.

The user device then generates a challenge response including the authentication data collected from the candidate cardholder and/or the user device (referred to herein as "response authentication data"). The challenge response may also include permission data and/or other data retrieved by the user device. The challenge response is transmitted to the authentication computing device for analysis. When the challenge response is received by the authentication computing device, the response authentication data is extracted and compared to the trusted authentication data. Any suitable analysis technique may be used to determine whether or not the user attempting to access the tax filing is the candidate cardholder. In one example, the authentication computing device compares the response authentication data to the trusted authentication data to determine if both sets of authentication data substantially match each other. In another example, the response authentication data and/or the trusted authentication data are encryption keys or encrypted data that are analyzed for authentication.

Based at least partially on the comparison, the authentication computing device determines or generates an authentication status. The authentication status indicates whether or not the user attempting to access the tax filing is authenticated as the candidate cardholder. In at least some embodiments, the authentication status may be determined using the permission data and/or other data collected or generated by the authentication computing device. The authentication status is transmitted to the revenue computing device to enable the revenue computing device to selectively provide access to the tax filing based on the authentication status. In one example, the authentication status identifies the user as "authenticated" or "declined". In another example, the authentication status may include additional or alternative options to provide the revenue computing device increased information regarding the authentication process.

In some embodiments, the authentication computing device is configured to generate one or more authentication scores based at least partially on the comparison of the response authentication data and the trusted authentication data. The authentication score represents a confidence level of the authentication computing device that the user attempting to access the tax filing is cardholder or a fraudulent party. In embodiments with multiple authentication scores, each score may represent a different aspect of the authentication process. For example, a separate authentication score may be assigned for the permission data, the comparison of the authentication data, and the revenue authentication result. The authentication scores may be aggregated or otherwise combined to form a composite authentication score. In certain embodiments, the authentication score is compared to one or more predefined score thresholds to determine the authentication status. That is, the predefined thresholds define a plurality of score regions therebetween that are associated with a particular authentication status. Based on which region includes the authentication score, the corresponding authentication status is assigned.

In the example embodiment, in response to receiving the authentication status and any other suitable data from the authentication computing device (e.g., authentication scores), the revenue computing device determines whether or not to permit the user to access the tax filing or deny the user access to the tax filing. In some embodiments, the revenue computing device automatically permits or denies access based on the authentication status. In such embodiments, the available authentication statuses may be known by the revenue computing device to enable the revenue computing device to be pre-programmed to respond accordingly to each authentication status. In other embodiments, the revenue computing device analyzes the authentication status and other data related to authentication to determine whether or not to provide access to the tax filing. In certain embodiments, an administrator associated with the revenue computing device manually approves or declines the access attempt.

Unlike at least some known systems for accessing a tax filing, the TA system includes an authentication process that is performed separately from the revenue computing device, thereby preventing fraudulent parties from adjusting security settings and options associated with the tax filing to gain access. Moreover, the candidate cardholder receives the identity challenge at the user device irrespective of what device was used to attempt to access the tax filing to enable the candidate cardholder to proactively identify fraudulent access attempts, especially when the user device is a mobile device (e.g., smartphone) that is carried or worn by the cardholder throughout the day.

In addition to increased security, the authentication computing device may be configured to facilitate initiating transactions associated with the tax filing using payment account data stored in the cardholder profile. In such embodiments, the revenue computing device may not store payment information associated with the candidate cardholder. When a user attempts to perform an action with the tax filing that has a corresponding fee, the revenue computing device transmits, in addition to or instead of the authentication request, a transaction request that provides details regarding a transaction to pay the fee. In the example embodiment, the transaction request is transmitted to the authentication computing device after the authentication status is determined. In at least some embodiments, the authentication computing device transmits a transaction summary to the user device of the candidate cardholder. The transaction summary provides details regarding the transaction to the candidate cardholder for review. The cardholder provides user input to the user device to generate a transaction permission response indicating whether or not the cardholder approves or declines the transaction. The transaction permission response is then transmitted to the authentication computing device. If the response indicates approval of the transaction, the authentication computing device may initiate the transaction. If the response indicates the transaction is declined, the authentication computing device notifies the revenue computing device of the declined transaction. In certain embodiments, the revenue computing device may block the user from accessing the tax filing if the response indicates the transaction is declined. In some embodiments, rather than initiating the transaction itself, the authentication computing device transmits payment information to the revenue computing device to initiate the transaction.

As described above, the authentication computing device is configured to generate an identity challenge for the cardholder. The identity challenge is configured to prompt the cardholder or a user device of the cardholder to provide authentication data for use in verifying that the user attempting to access the tax filing is in fact the cardholder. In particular, the authentication data that the identity challenge is configured to request is based on the trusted authentication data stored in the cardholder profile. That is, if the trusted authentication data is a fingerprint of the candidate cardholder, the identity challenge is generated to request a corresponding fingerprint. Additionally or alternatively, the trusted authentication data may be a registered user device ID, a registered user device cell phone number or registered user device email address where the authentication computing device is then able to send a security code to said registered user device using any of these methods so that the user can then input the security code into the user device attempting to access the tax filing to authenticate the user to the authentication computing device. In the example embodiment, the authentication request can be sent by the revenue computing device using an API to the authentication computing device. In another embodiment, the authentication request can be sent as part of online payment associated with a Three Domain Secure ("3DS") protocol, which is an Extendable Markup Language ("XML") based protocol that acts as an additional security layer for online credit and debit card transactions. The 3DS protocol ties a financial authorization process with an online authentication associated with: (i) an acquirer domain (the merchant and the bank to which money is being paid), (ii) an issuer domain (the bank which issued the card being used), and (iii) an interoperability domain (the infrastructure provided by the card network). More specifically, a requesting application (e.g., user device interacting with the revenue computing device) may send payment information to an Access Control Server ("ACS") (associated with the interoperability domain) during a checkout process. The ACS may respond with a challenge for the account holder to provide biometric verification of his or her presence at the user device. A biometric authentication unit may perform this function. Other authentication services that are based on 3-D Secure® (Visa International Service Association, Delaware) protocol include Mastercard SecureCode® (Mastercard International Incorporated, Purchase, N.Y.)) and Verified by Visa® (Visa International Service Association, Delaware).

In contemplated embodiments, the enrollment includes opt-in informed consent of users to data usage by the system consistent with consumer protection laws and privacy regulations. In some embodiments, the enrollment data and/or other collected data may be anonymized and/or aggregated prior to receipt such that no personally identifiable information (PII) is received. In other embodiments, the system may be configured to receive enrollment data and/or other collected data that is not yet anonymized and/or aggregated, and thus may be configured to anonymize and aggregate the data. In such embodiments, any PII received by the system is received and processed in an encrypted format, or is received with the consent of the individual with which the PII is associated. In situations in which the systems discussed herein collect personal information about individuals including cardholders or merchants, or may make use of such personal information, the individuals may be provided with an opportunity to control whether such information is collected or to control whether and/or how such information is used. In addition, certain data may be processed in one or more ways before it is stored or used, so that personally identifiable information is removed.

The methods and systems described herein may be implemented using computer programming or engineering techniques including computer software, firmware, hardware or any combination or subset thereof, wherein the technical effects may be achieved by performing one of the following steps: (i) storing, by an authentication computing device, a cardholder profile that is associated with a candidate cardholder and includes a cardholder identifier, a device identifier, payment account data, and trusted authentication data associated with the candidate cardholder; (ii) receiving, by the authentication computing device, an authentication request that is associated with a tax filing of the candidate cardholder and includes a filing identifier from a revenue computing device; (iii) detecting the authentication request is associated with the candidate cardholder based at least partially upon the filing identifier and the cardholder profile; (iv) transmitting an identity challenge to a user device associated with the device identifier of the cardholder profile; (v) requesting authentication data associated with the candidate cardholder for the tax filing based on the identity challenge; (vi) receiving, by the authentication computing device, a challenge response including response authentication data from the user device; (vii) determining, by the authentication computing device, an authentication status associated with the authentication request based at least partially on a comparison of the response authentication data and the trusted authentication data of the cardholder profile; and (viii) transmitting, by the authentication computing device, the authentication status to the revenue computing device such that the revenue computing device determines whether the tax filing is fraudulent based at least in part on the authentication status.

The systems and methods described herein are configured to facilitate (a) improved security for tax filings, (b) reduced allocation of processing, network, and storage resources towards reacting to fraudulent activity, thereby increasing the resources available for other functionality, (c) proactive identification by the cardholder of fraud, and (d) integration between payment systems and tax reporting systems.

The technical problems addressed by the payment card processing systems and methods of the disclosure include at least one of: (i) fraudulent electronic tax filings in a revenue authority system; (ii) inefficient tax filing verification processes in a revenue authority system; (iii) inability to authenticate tax filings with readily available electronic records; (iv) financial loss via vulnerabilities in automated tax filing systems; and (v) inability to distinguish non-fraudulent tax filings from fraudulent tax filings in revenue authority systems.

At least one technical problem with known systems is that, in view of the volume of financial transactions and tax filings, it can be difficult, time-consuming, and/or resource-intensive to determine whether a tax filing is fraudulent. To reduce a risk of fraudulent filings, at least some known systems are configured to decline a tax filing if the filer does not provide authentication in association with the tax filing. The embodiments described herein address at least these technical problems. By processing tax filings in the manner described in this disclosure, some embodiments improve user experience, user efficiency, and/or user interaction performance by using transaction data associated the tax filing to calculate risk associated with approving a tax filing, and potentially an associated refund payment. Additionally or alternatively, some embodiments potentially reduce a quantity of requests to provide authentication. In this manner, the embodiments described herein may facilitate achieving a balance between convenience to the filer and security against fraudulent tax filings and/or transactions. Additionally, some embodiments may reduce processor load by reducing an amount of data to be analyzed or processed, reduce network bandwidth usage and/or improve communication between systems by reducing an amount of data to be transmitted, improve processor security and/or data transmission security by using biometric data to process financial transactions and tax filings, and/or reduce error rate by automating the analysis and processing of financial transactions and tax filings. In some embodiments, the subject matter described herein may facilitate increasing processor speed and/or improving operating system resource allocation.

The resulting technical benefits achieved by the payment card processing systems and methods include at least one of: (i) electronic assistance in authenticating tax filings in a shorter timeframe; (ii) electronic improvements in detection of fraudulent tax filings in a revenue authority system; (iii) electronic storage and management of tax filing authentication data to reduce time and effort by agents of the revenue authority system in responding to tax filings; (iv) elimination of electronic vulnerabilities to fraud and financial loss in automated tax filings process in a revenue authority system; (vi) electronic assessment and confirmation to distinguish non-fraudulent tax filings from fraudulent filings in the process of a revenue authority system; (vii) increased accuracy in the electronic detection of fraudulent tax filings through multifactor authentication; and (iix) increased accuracy the electronic detection of fraudulent tax filings through correlation to payment transaction data.

In certain aspects of the disclosure, the resulting technical benefits include reduced duplication of processing and/or data storage resources between the payment network and the revenue authority system. In one aspect, the revenue authority system leverages the authentication data and processing utility of the payment network, such that the processing and data storage load on the revenue authority system is reduced. In another aspect, the process of authenticating tax filings is distributed between the payment network and the revenue authority system, such that the latency in authenticating tax filings is reduced. In yet another aspect, data duplication is reduced between the revenue authority system and the payment network. For example, the revenue authority system may authenticate tax filings based on a cardholder profile stored by the payment network, instead of maintaining a separate (e.g., duplicate) profile regarding the cardholder. In other words, reducing duplicate authentication records between the two systems leads to increased storage efficiency and reduced processing errors due to outdated and/or mismatched records.

As will be appreciated, based on the description herein the technical improvement in the tax filing and/or payment card system as described above is a computer-based solution to a technical deficiency or problem that is itself rooted in computer technology (i.e., the problem itself derives from the use of computer technology). More specifically, the technical problems and inefficiencies created by the conventional fraud detection and chargeback methods and systems within a payment card and/or tax filing system are the result of implementation and use of computers in those fraud detection, chargeback, and payment card systems and related methods. The present invention improves upon the conventional methods and systems in the manners described herein. Thus, the inefficiencies or technical problems created by the conventional fraud detection and chargeback methods and systems within a payment card and/or tax filing system as described herein are solved (i.e., the desired outcome of achieving increased efficiencies over the conventional fraud detection and chargeback methods and systems are achieved) by the methods and systems described and particularly claimed herein.

Described herein are computer systems such as a revenue computing device and an authentication computing device. As described herein, all such computer systems include a processor and a memory.

Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The systems and processes are not limited to the specific embodiments described herein. In addition, components of each system and each process can be practiced independent and separate from other components and processes described herein. Each component and process also can be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be used as a method of payment for performing a transaction.

The following detailed description illustrates embodiments of the disclosure by way of example and not by way of limitation. It is contemplated that the disclosure has general application to authenticate candidate cardholders for a variety of secure data environments.

FIG. 1 is a schematic diagram illustrating an example tax authentication (TA) system 100 for authenticating tax filings associated with cardholder. In the example embodiment, TA system 100 includes a revenue computing device 102, a plurality of user devices 104, and an authentication computing device 106. In other embodiments, system 100 includes additional, fewer, or alternative devices, including those described elsewhere herein.

Revenue computing device 102 is associated with a revenue authority and/or a third party that is in communication with the revenue authority. Revenue computing device 102 is configured to store tax filings in a tax database 108 organized by the taxable entity. The tax filings may include one or more predefined data structures to store the information and files associated with the tax filing together to enable efficient retrieval of the tax filing. Revenue computing device 102 is further configured to provide a tax interface 110 that enables taxable entities to access their respective tax filings using user devices 104. Tax interface 110 may be a web interface, an application interface (i.e., an application associated with the revenue computing device is stored on computing devices associated with taxable entities), and the like. Through tax interface 110, the taxable entities provide tax-related information and perform actions associated with the tax filing, such as submit the tax filing for review by the revenue authority. The taxable entity may also provide payment information for the tax filing to pay any fees associated with the tax filing and/or to identify a payment account for receiving a monetary tax return. In at least some embodiments, to limit or otherwise prevent fraudulent access to the tax filings, Revenue computing device 102 may perform an authentication process for each user attempting to access or perform an action with a tax filing.

In the example embodiment, user devices 104 are computing devices associated with a particular user or taxable entity. For example, user devices 104 may be smartphones, smart watches, tablets, laptops, wearable electronics, and/or other suitable computing devices. User devices 104 are communicatively coupled to revenue computing device 102 via interface 110 to access a tax filing. User devices 104 may further be communicatively coupled to authentication computing device 106 as described herein.

In the example embodiment, authentication computing device 106 is communicatively coupled to a payment processing network (not shown) that processes payment transactions to provide an authentication service for the payment transactions. In particular, authentication computing device 106 may be configured to provide an authentication service for transactions involving payment cards (e.g., debit cards, credit cards, gift cards, etc.) including both card-present transactions and card-not-present transactions (e.g., web-based transactions using the account information on the payment card). When a payment transaction is initiated and submitted to the payment processing network, authentication computing device 106 is configured to authenticate a cardholder of the transaction to prevent fraudulent use of the cardholder's payment account. Authentication computing device 106 requests and analyzes data to determine an authentication status (e.g., "approved" or "decline") of the user initiating the transaction.

Authentication computing device 106 is communicatively coupled to revenue computing device 102 and user devices 104 to provide the authentication service for authenticating users attempting to access tax filings. That is, cardholders enrolled in the authentication service may be authenticated using authentication computing device 106. The authentication process provided by authentication computing device 106 separate from revenue computing device 102 may prevent fraudulent users from adjusting security settings for the tax filing to cause the revenue computing device 102 from treating the fraudulent users as the legitimate users.

Figure 2A:
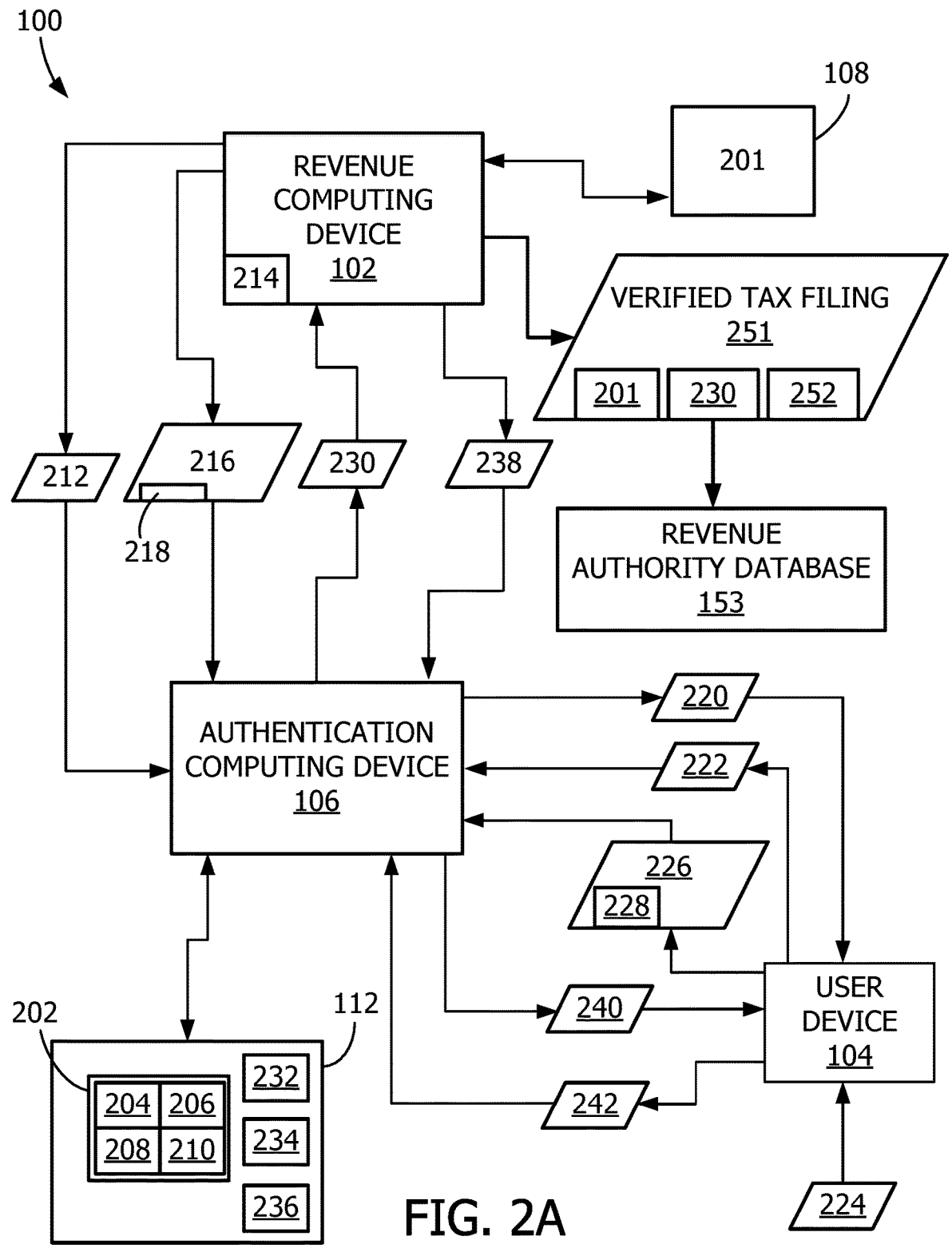
FIG. 2A is an example data flow diagram of the system shown in FIG. 1.

FIG. 2A is an example data flow diagram of an authentication process to authenticate a candidate cardholder to access a corresponding tax filing 201 for use with system 100 (shown in FIG. 1). In other embodiments, the authentication process includes additional, fewer, or alternative data and/or steps, including those described elsewhere herein.

Prior to the authentication process, the candidate cardholder is enrolled or registered for the authentication service provided by authentication computing device 106. The authentication service may be an opt-in service that is provided to cardholders upon receiving permission from the cardholders. In some embodiments, the cardholder is automatically registered for the authentication service when activating a payment account and/or payment card. During registration, authentication computing device 106 prompts the candidate cardholder (e.g., via user device 104 of the candidate cardholder) to provide information for a cardholder profile 202. Cardholder profile 202 includes, for example, and without limitation, a cardholder identifier 204, a device identifier 206, payment account data 208, and trusted authentication data 210. Cardholder identifier 204 indicates a cardholder associated with cardholder profile 202. Device identifier 206 is associated with user device 104 of the candidate cardholder. In at least some embodiments, device identifier 206 includes contact information of user device 104 to enable authentication computing device 106 to communicate with user device 104. Payment account data 208 includes payment information to identify one or more payment accounts associated with the candidate cardholder. The payment information may include, for example, an account identifier (e.g., primary account number (PAN)), an account expiration date, available funds, and the like. Trusted authentication data 210 is data used to authenticate the identity of the candidate cardholder and is presumed to be associated with the candidate cardholder. Authentication data is any suitable data that may represent the identity of a user, such as biometric data (e.g., fingerprints, iris scans, facial images, etc.), device data (e.g., unique identifiers stored by a device, encryption keys, etc.), passwords, PINs, and the like.

Cardholder profile 202 is stored in a database system 112 in communication with authentication computing device 106 to enable authentication computing device 106 to extract data elements from received data and compare the extracted data elements to the stored cardholder profiles 202 to identify a candidate cardholder that is associated with the received data.

In the example embodiment, to determine whether or not a user registered with revenue computing device 102 is enrolled in the authentication service of authentication computing device 106, revenue computing device 102 transmits information associated with the user to authentication computing device 106. In particular, revenue computing device 102 transmits payment information 212 to authentication computing device 106 for comparison to the stored cardholder profiles 202. Payment information 212 is information provided to revenue computing device 102 by the user accessing tax filing 201 to facilitate transactions associated with tax filing 201. For example, payment information 212 may include a cardholder identifier and/or a payment account identifier. Payment information 212 is compared to the stored cardholder profile 202 to identify (if any) a matching cardholder. Authentication computing device 106 then notifies revenue computing device 102 whether or not the user is enrolled in the authentication service. In certain embodiments, revenue computing device 102 updates stored information associated with the user to indicate the enrollment in the authentication service.

In the example embodiment, when a user (i.e., a taxable entity) enrolled in the authentication service attempts to access tax filing 201, make changes to tax filing 201, submit tax filing 201, and/or receive reimbursement for tax filing 201 (i.e., a tax return or refund), revenue computing device 102 may perform an initial authentication process. The initial authentication process may include, for example, prompting the user to provide a username and/or password associated with tax filing 201. Revenue computing device 102 generates a revenue authentication result 214 from the initial authentication process. Revenue authentication result 214 indicates whether or not the user is authenticated. In at least some embodiments, when revenue authentication result 214 does not indicate the user is authenticated, revenue computing device 102 prevents the user from access tax filing 201. When revenue authentication result 214 indicates that the user is authenticated, revenue computing device 102 notifies authentication computing device 106 to begin the authentication process for multi-factor authentication.

In the example embodiment, revenue computing device 102 transmits an authentication (auth.) request 216 to authentication computing device 106. Request 216 includes at least a filing identifier 218 associated with tax filing 201. Filing identifier 218 may be selected to correspond to at least one data elements stored within a cardholder profile 202. For example, filing identifier 218 may be a cardholder identifier (e.g., a name of the cardholder), payment account data, and/or another suitable unique identifier. Authentication computing device 106 is configured to detect that authentication request 216 is associated with a particular candidate cardholder based at least partially upon filing identifier 218. That is, filing identifier 218 is used to query the stored cardholder profiles 202 and identify a cardholder profile 202 associated with the candidate cardholder. In some embodiments, authentication request 216 may further include a description of the action that prompted revenue computing device 102 to transmit authentication request 216. For example, authentication request 216 may indicate an attempt to submit tax filing 201 to the revenue authority.

Authentication computing device 106 is configured to generate an identity challenge 220 for the candidate cardholder. Identity challenge 220 is configured to prompt the candidate cardholder or a user device 104 of the cardholder to provide authentication data for use in verifying that the user attempting to access tax filing 201 is in fact the legitimate cardholder. In particular, the authentication data that identity challenge 220 is configured to request is based on trusted authentication data 210 stored in cardholder profile 202. That is, if trusted authentication data 210 is a fingerprint (or a hashed version of a finger print) of the candidate cardholder, identity challenge 220 is generated to request a corresponding fingerprint. In some embodiments, if cardholder profile 202 includes multiple types of trusted authentication data 210, identity challenge 220 may prompt the cardholder to provide multiple forms of authentication data.

Identity challenge 220 is transmitted to user device 104 of the candidate cardholder based at least partially on device identifier 206. Identity challenge 220 may be transmitted as a text message, an email, a device notification, and/or any other suitable form of communication. Identity challenge 220 may indicate to the candidate cardholder what caused challenge 220 to be sent (e.g., an access attempt associated with the cardholder's tax filing) to enable the cardholder to determine whether challenge 220 is being sent as a result of a fraudulent activity. In certain embodiments, identity challenge 220 may request permission data 222 from the candidate cardholder. Permission data 222 indicates whether or not the cardholder identifies the cause of authentication request 216 as fraudulent or permissible. If permission data 222 indicates potential fraud, authentication computing device 106 notifies revenue computing device 102 to decline or otherwise prevent access to tax filing 201.

Identity challenge 220 causes user device 104 and/or the candidate cardholder to collect authentication data to authenticate the access attempt of tax filing 201. Depending upon the type of authentication data requested, the candidate cardholder provides user input 224 including authentication data and/or user device 104 generates or retrieves the authentication data. In certain embodiments, identity challenge 220 is processed by an application installed on user device 104 to generate a notification to the candidate cardholder to provide the authentication data. In one embodiment, the application is associated with a payment account of the candidate cardholder. For example, the application may be associated with a bank or a payment network provider, such as a digital wallet application.

User device 104 then generates a challenge response 226 including the authentication data collected from the candidate cardholder and/or the user device (referred to herein as "response authentication data 228"). Challenge response 226 may also include permission data 222 and/or other data retrieved by user device 104. Challenge response 226 is transmitted to authentication computing device 106 for analysis. When challenge response 226 is received by authentication computing device 106, response authentication data 228 is extracted and compared to trusted authentication data 210. Any suitable analysis technique may be used to determine whether or not the user attempting to access tax filing 201 is the candidate cardholder. In one example, authentication computing device 106 compares response authentication data 228 to trusted authentication data 210 to determine if both sets of authentication data substantially match each other. In another example, response authentication data 228 and/or trusted authentication data 210 are encryption keys or encrypted data that are analyzed for authentication.

Based at least partially on the comparison, authentication computing device 106 determines or generates an authentication status 230. Authentication status 230 indicates whether or not the user attempting to access tax filing 201 is authenticated as the candidate cardholder. In at least some embodiments, authentication status 230 may be determined using permission data 222 and/or other data collected or generated by authentication computing device 106. Authentication status 230 is transmitted to revenue computing device 102 to enable revenue computing device 102 to selectively provide access to tax filing 201 based on authentication status 230. In one example, authentication status 230 identifies the user as "authenticated" or "declined". In another example, authentication status 230 may include additional or alternative options to provide revenue computing device 102 increased information regarding the authentication process.

In some embodiments, authentication computing device 106 is configured to generate one or more authentication scores 232 based at least partially on the comparison of response authentication data 228 and trusted authentication data 210. Authentication score 232 represents a confidence level of authentication computing device 106 that the user attempting to access tax filing 201 is cardholder or a fraudulent party. In embodiments with multiple authentication scores 232, each score 232 may represent a different aspect of the authentication process. For example, a separate authentication score 232 may be assigned for permission data 222, the comparison of the authentication data 210, 228, and revenue authentication result 214. Authentication scores 232 may be aggregated or otherwise combined to form a composite authentication score 234. In certain embodiments, authentication score 232 is compared to one or more predefined score thresholds 236 to determine authentication status 230. That is, the predefined thresholds 236 define a plurality of score regions therebetween that are associated with a particular authentication status 230. Based on which region includes authentication score 232, the corresponding authentication status 230 is assigned.

In the example embodiment, in response to receiving authentication status 230 and any other suitable data from authentication computing device 106 (e.g., authentication scores 232), revenue computing device 102 determines whether or not to permit the user to access tax filing 201 or deny the user access to tax filing 201. In some embodiments, revenue computing device 102 automatically permits or denies access based on authentication status 230. In such embodiments, the available authentication statuses 230 may be known by revenue computing device 102 to enable revenue computing device 102 to be pre-programmed to respond accordingly to each authentication status 230. In other embodiments, revenue computing device 102 analyzes authentication status 230 and other data related to authentication to determine whether or not to provide access to tax filing 201. In certain embodiments, an administrator associated with revenue computing device 102 manually approves or declines the access attempt.

In some embodiments, in response to receiving authentication status 230 and any other suitable data from authentication computing device 106 (e.g., authentication scores 232), revenue computing device 102 is configured to generate a verified tax filing 251 included on tax filing 201 and authentication status 230. Verified tax filing 251 may be formatted as an XML file, JSON file, text file, and the like. In certain embodiments, verified tax filing 251 further includes a digital signature 252. In one embodiment, digital signature 252 includes a cryptographic hash indicating tax filing 201 has been verified, and that the tax filing 201 has not been modified since the verification. In another embodiment, digital signature 252 may be encrypted using a key associated with the revenue computing device 102 and/or the authentication computing device 106. For example, verified tax filing 251 may include a digital signature 252 encrypted using a key associated with authentication computing device 106, indicating that the authentication was correctly performed (e.g., not modified or forged). In yet another embodiment, digital signature 252 may include a key value associated with authentication status 230, such as an authentication confirmation number.

In certain embodiments, revenue computing device 102 is configured to transmit a verified tax filing 251 to a revenue authority database 153. For example, revenue authority database 153 may be an official record of tax filings. In another example, revenue authority database 153 is associated processing submitted tax filings, such as generating refunds. In one embodiment, revenue computing device 102 is configured to create records within revenue authority database 153, based on the verified tax filing 251. In another embodiment, revenue computing device 102 is configured to transmit the verified tax filing 251 to revenue authority database 153 using an API (e.g., web API, socket connection).

In some embodiments, revenue authority database 153 may be configured to query authentication computing device 106 with authentication status 230 included in the verified tax filing 251 to confirm the authentication status. For example, revenue authority database 153 may compare authentication status 230 with the authentication computing device to detect a forged and/or modified authentication status. In one embodiment, the revenue authority database 153 queries authentication computing device 106 with an authentication identifier included in the authentication status 230, and receives a query response indicating that the authentication identifier has been confirmed (e.g., matches authentication records) by the authentication computing device 106.

In addition to increased security, authentication computing device 106 may be configured to facilitate initiating transactions associated with tax filing 201 using payment account data 208 stored in cardholder profile 202. In such embodiments, revenue computing device 102 may not store payment information 212 associated with the candidate cardholder. When a user attempts to perform an action with tax filing 201 that has a corresponding fee, revenue computing device 102 transmits, in addition to or instead of authentication request 216, a transaction request 238 that provides details regarding a transaction to pay the fee. In the example embodiment, transaction request 238 is transmitted to authentication computing device 106 after authentication status 230 is determined. In at least some embodiments, authentication computing device 106 transmits a transaction summary 240 to user device 104 of the candidate cardholder. Transaction summary 240 provides details regarding the transaction to the candidate cardholder for review. The cardholder provides user input to user device 104 to generate a transaction permission response 242 indicating whether or not the cardholder approves or declines the transaction. Transaction permission response 242 is then transmitted to authentication computing device 106. If response 242 indicates approval of the transaction, authentication computing device 106 may initiate the transaction. If response 242 indicates the transaction is declined, authentication computing device 106 notifies revenue computing device 102 of the declined transaction. In certain embodiments, revenue computing device 102 may block the user from accessing tax filing 201 if response 242 indicates the transaction is declined. In some embodiments, rather than initiating the transaction itself, authentication computing device 106 transmits payment information 212 to revenue computing device 102 to initiate the transaction.

In the example embodiment, authentication request 216 is sent to authentication computing device 106 by revenue computing device 102 using an API (e.g., web API, socket connection).

Figure 2B:
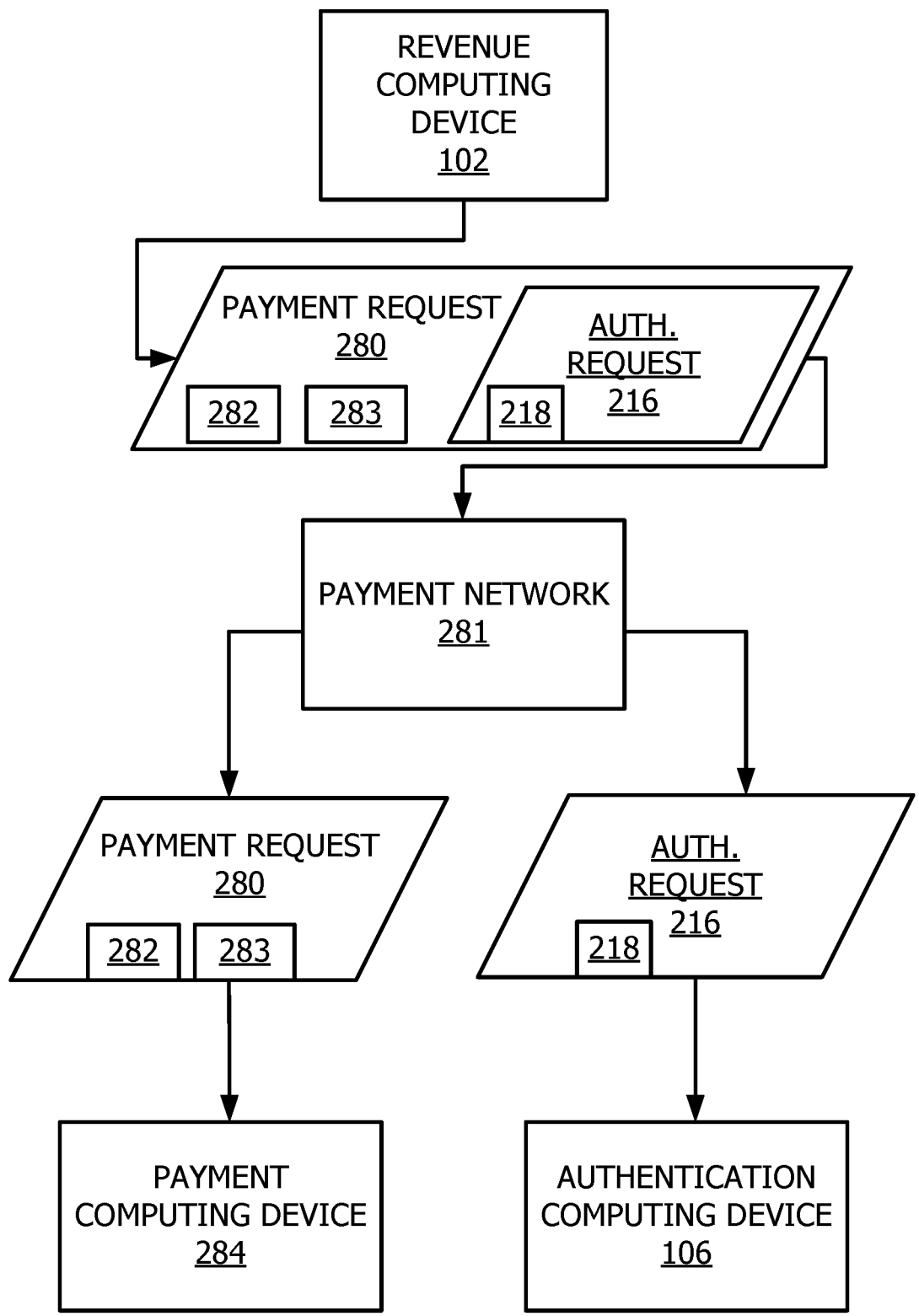
FIG. 2B is another example data flow diagram of the system shown in FIG. 1.

FIG. 2B is another example data flow diagram of an authentication process to authenticate a candidate cardholder to access a corresponding tax filing 201 for use with system 100 (shown in FIG. 1). Specifically, FIG. 2B depicts the transmission of an authentication request 216 using a payment network 281.

In certain embodiments, revenue computing device 102 (shown in FIG. 1) is configured to process payment card transactions associated with tax filing 201 (shown in FIG. 2A), such as filing fees or preparation fees. In some embodiments, request 216 (shown in FIG. 2A) is included in a payment request 280. Payment request 280 includes at least a payment card identifier, and a transaction amount, in addition to authentication request 216.

In some embodiments, authentication request 216 may be generated when payment request 280 is an online payment associated with a Three Domain Secure ("3DS") protocol, which is an Extendable Markup Language ("XML") based protocol that acts as an additional security layer for online credit and debit card transactions. For example, in response to payment request 280, an Access Control Server ("ACS") associated with payment network 281 (shown in FIG. 2B) may transmit a challenge for the account holder to provide biometric verification of his or her presence at the user device. A biometric authentication unit may perform this function. In some embodiments, payment network 281 and/ or an ACS may generate authentication request 216 in response to risk based decision ("RBD") rules, where the risk (e.g., trust, confidence) in the authenticity of payment request 280 is evaluated. For example, multiple tax filings associated with a single account identifier may indicate increased risk, such that payment network 218 may generate an authentication request 216 using the 3DS protocol.

In some embodiments, authentication computing device 106 is an integral component of a payment network processing payment card transactions. Additionally or alternatively, authentication computing device 106 is in communication with a payment network, such as payment network 281.

In one embodiment, revenue computing device 102 generates a payment request 280 associated with a preparation fee, and further includes request 216 associated with filing authentication. Revenue computing device 102 further transmits the payment request 280 to payment network 281. Payment network 281 is configured to forward the request 216 included in payment request 280 to authentication computing device 106, and further configured to process payment request 280, including forwarding the payment request 280, at least in part, to a payment computing device 284. In some embodiments, payment computing device 284 is associated with a bank and/or financial institution processing payment card transactions.

As described above, authentication computing device 106 is configured to generate an identity challenge for the cardholder. The identity challenge is configured to prompt the cardholder or a user device of the cardholder to provide authentication data for use in verifying that the user attempting to access the tax filing is in fact the cardholder. In particular, the authentication data that the identity challenge is configured to request is based on the trusted authentication data stored in the cardholder profile. That is, if the trusted authentication data is a fingerprint of the candidate cardholder, the identity challenge is generated to request a corresponding fingerprint. Additionally or alternatively, the trusted authentication data may be a registered user device ID, a registered user device cell phone number or registered user device email address where authentication computing device 106 is then able to send a security code to said registered user device using any of these methods so that the user can then input the security code into the user device attempting to access the tax filing to authenticate the user to authentication computing device 106. In the example embodiment, authentication request 216 can be sent as part of online payment 280 associated with a Three Domain Secure ("3DS") protocol, which is an Extendable Markup Language ("XML") based protocol that acts as an additional security layer for online credit and debit card transactions. The 3DS protocol ties a financial authorization process with an online authentication associated with: (i) an acquirer domain (the merchant and the bank to which money is being paid), (ii) an issuer domain (the bank which issued the card being used), and (iii) an interoperability domain (the infrastructure provided by the card network). More specifically, a requesting application (e.g., user device interacting with the revenue computing device) may send payment information to an Access Control Server ("ACS") (associated with the interoperability domain or payment network 281) during a checkout process. The ACS may respond with a challenge for the account holder to provide biometric verification of his or her presence at the user device. A biometric authentication unit may perform this function. Other authentication services that are based on 3-D Secure® (Visa International Service Association, Delaware) protocol include Mastercard SecureCode® (Mastercard International Incorporated, Purchase, N.Y.)) and Verified by Visa® (Visa International Service Association, Delaware).

Figure 3:
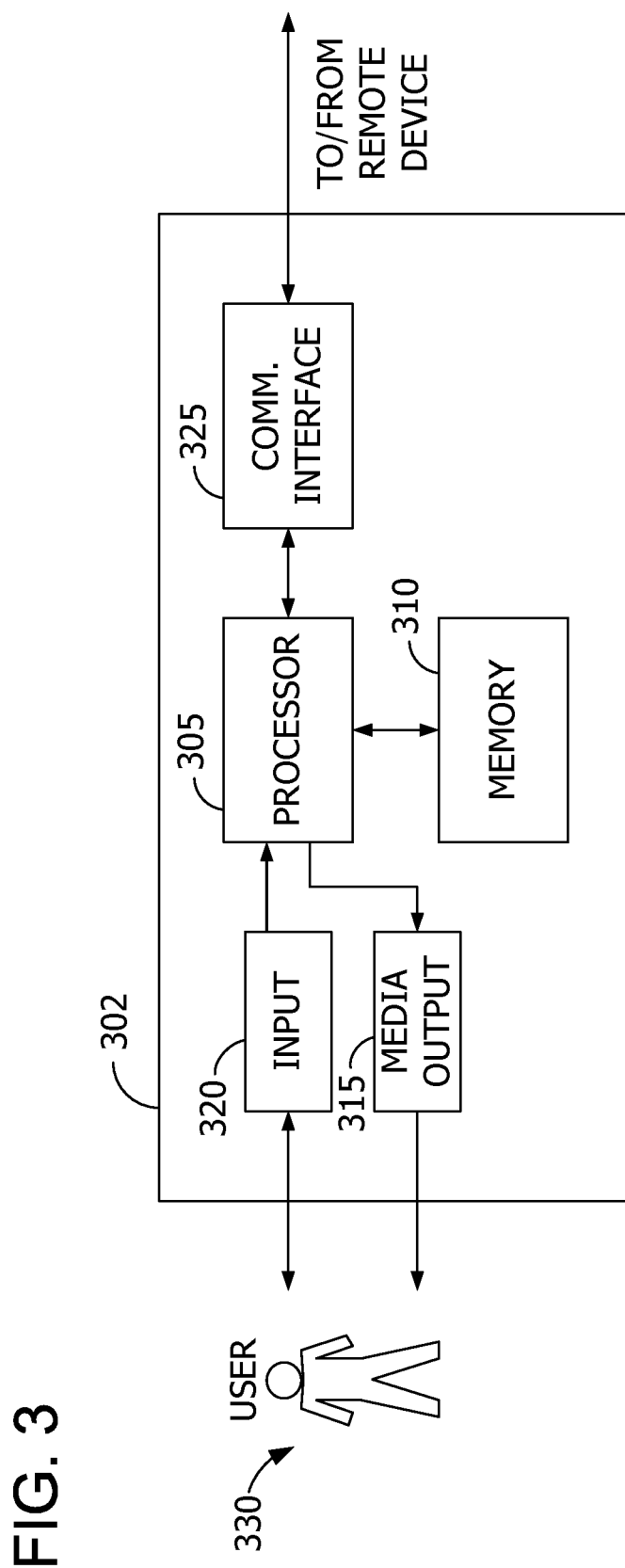

FIG. 3 depicts an exemplary configuration of a remote or user computing device 302, such as user device 104 (shown in FIG. 1). Computing device 302 may include a processor 305 for executing instructions. In some embodiments, executable instructions may be stored in a memory area 310. Processor 305 may include one or more processing units (e.g., in a multi-core configuration). Memory area 310 may be any device allowing information such as executable instructions and/or other data to be stored and retrieved. Memory area 310 may include one or more computer-readable media.

Computing device 302 may also include at least one media output component 315 for presenting information to a user 330. Media output component 315 may be any component capable of conveying information to user 330. In some embodiments, media output component 315 may include an output adapter, such as a video adapter and/or an audio adapter. An output adapter may be operatively coupled to processor 305 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 315 may be configured to present an interactive user interface (e.g., a web browser or client application) to user 330.

In some embodiments, computing device 302 may include an input device 320 for receiving input from user 330. Input device 320 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 315 and input device 320.

Computing device 302 may also include a communication interface 325, which may be communicatively coupleable to a remote device. Communication interface 325 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 310 are, for example, computer-readable instructions for providing a user interface to user 330 via media output component 315 and, optionally, receiving and processing input from input device 320. A user interface may include, among other possibilities, a web browser and client application. Web browsers enable users 330 to display and interact with media and other information typically embedded on a web page or a website from a web server associated with revenue computing device 102 and/or authentication computing device 106 (both shown in FIG. 1). A client application allows users 330 to interact with a server application associated with, for example, revenue computing device 102 and/or authentication computing device 106. For example, a client application stored on user device 104 may enable user 330 to interact with revenue computing device 102.

Figure 4:
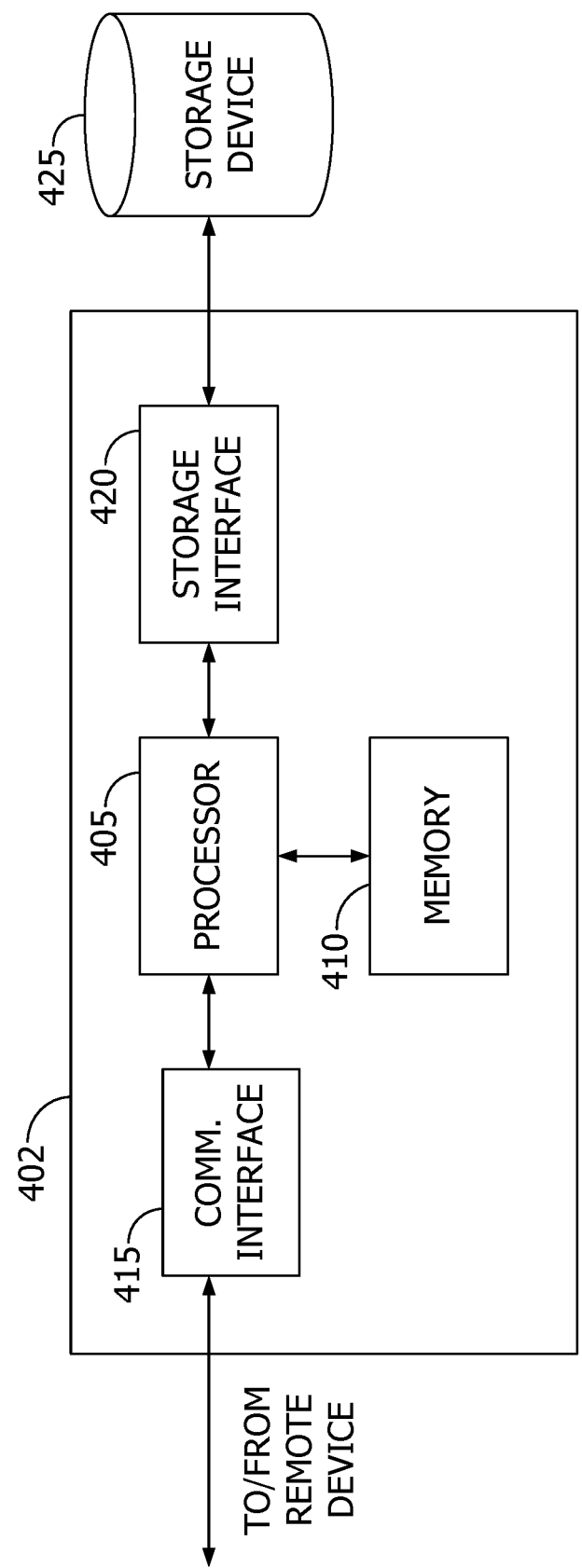

FIG. 4 depicts an exemplary configuration of a host computing device 402, such as revenue computing device 102 and authentication computing device 106 (both shown in FIG. 1). Host computing device 402 may include a processor 405 for executing instructions. Instructions may be stored in a memory area 410, for example. Processor 405 may include one or more processing units (e.g., in a multi-core configuration).

Processor 405 may be operatively coupled to a communication interface 415 such that host computing device 402 may be capable of communicating with a remote device such as computing device 302 shown in FIG. 3 or another host computing device 402. For example, communication interface 415 may receive requests from user computing device 402 via the Internet.

Processor 405 may also be operatively coupled to a storage device 425. Storage device 425 may be any computer-operated hardware suitable for storing and/or retrieving data. In some embodiments, storage device 425 may be integrated in host computing device 402. For example, host computing device 402 may include one or more hard disk drives as storage device 425. In other embodiments, storage device 425 may be external to host computing device 402 and may be accessed by a plurality of host computing devices 402. For example, storage device 425 may include multiple storage units such as hard disks or solid state disks in a redundant array of inexpensive disks (RAID) configuration. Storage device 425 may include a storage area network (SAN) and/or a network attached storage (NAS) system.

In some embodiments, processor 405 may be operatively coupled to storage device 425 via a storage interface 420. Storage interface 420 may be any component capable of providing processor 405 with access to storage device 425. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 425.

Memory areas 310 (shown in FIG. 3) and 410 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and nonvolatile RAM (NVRAM). The above memory types are example only, and are thus not limiting as to the types of memory usable for storage of a computer program.

Figure 5:
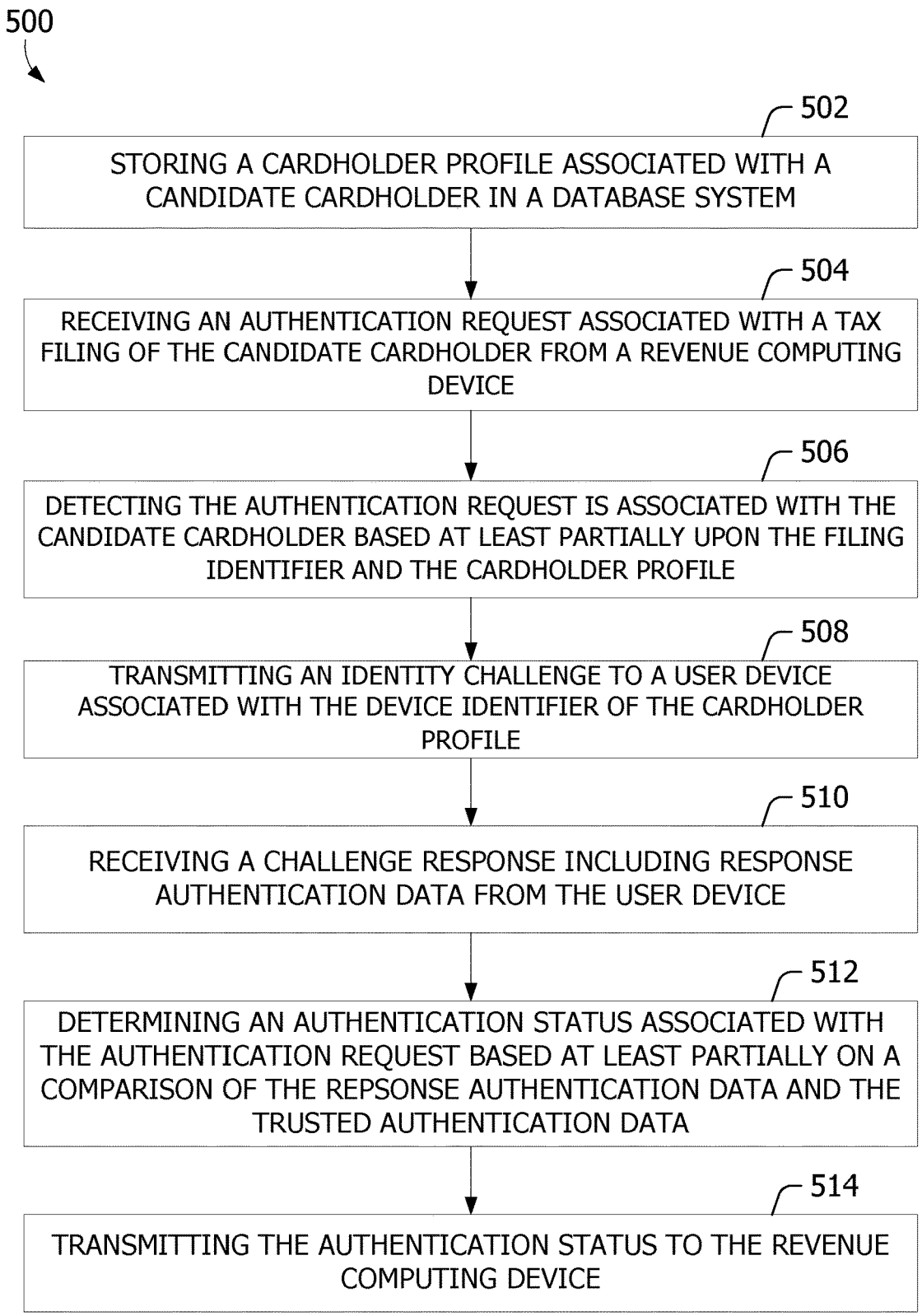

FIG. 5 is a flow diagram of an example method 500 for authenticating a tax filing associated with a candidate cardholder using a TA system, such as system 100 (shown in FIG. 1). In the example embodiment, method 500 is at least partially performed by an authentication computing device. In certain embodiments, method 500 may be at least partially performed by a different computing device. In other embodiments, method 500 may include additional, fewer, or alternative actions, including those described elsewhere herein.

Method 500 begins with the authentication computing device storing 502 a cardholder profile associated with a candidate cardholder in a database system. The cardholder profile includes, for example, a cardholder identifier, a device identifier, payment account data, and trusted authentication data associated with the candidate cardholder. The authentication computing device then receives 504 an authentication request that is associated with a tax filing of the candidate cardholder and includes a filing identifier from a revenue computing device. The authentication computing device detects 506 that the authentication request is associated with the candidate cardholder based at least partially upon the filing identifier and the cardholder profile. The authentication computing device transmits 508 an identity challenge to a user device associated with the device identifier of the cardholder profile. The identity challenge requests authentication data associated with the candidate cardholder for the tax filing. In some embodiments, the identity challenge may request permission to proceed with the authentication process from the candidate cardholder.

The authentication computing device receives 510 a challenge response including response authentication data form the user device. The authentication computing device then determines 512 an authentication status associated with the authentication request based at least partially on a comparison of the response authentication data and the trusted authentication data of the cardholder profile. The authentication computing device transmits 514 the authentication status to the revenue computing device such that the revenue computing device can determine whether or not to the tax filing access attempt is fraudulent.

Figure 6:
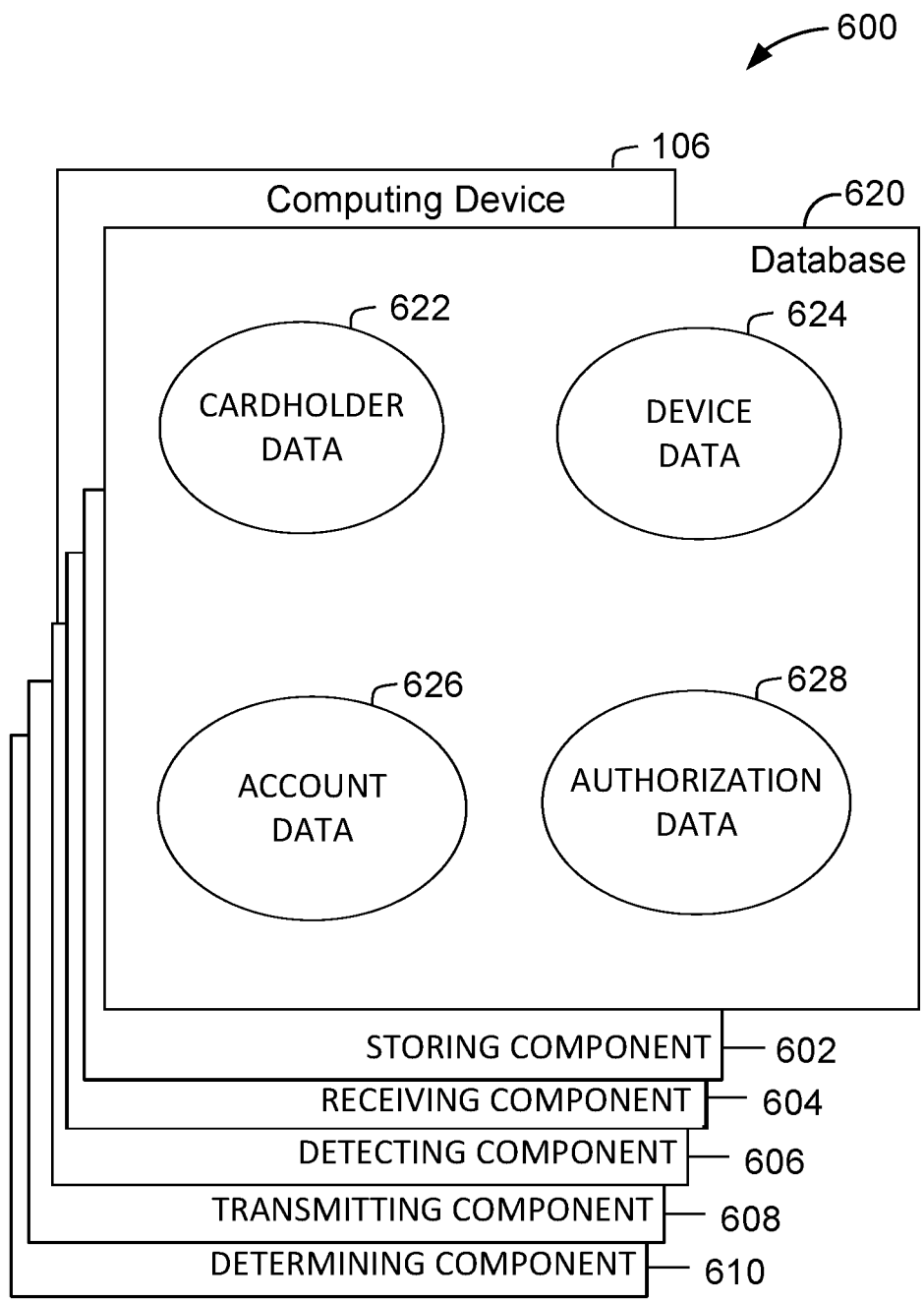

FIG. 6 is a diagram 600 of components of one or more example computing devices that may be used in the method shown in FIG. 5. FIG. 6 further shows a configuration of a distributed database system 620 Database system 620 is coupled to several separate components within authentication computing device 106 (shown in FIG. 1), which perform specific tasks.

Authentication computing device 106 includes a storing component 602 configured to store a cardholder profile associated with a candidate cardholder in database system 620. Authentication computing device 106 further includes a receiving component 604 configured to receive an authentication request and/or to receive a challenge response from a user device. Authentication computing device 106 also includes a detecting component 606 configured to detect that the authentication request is associated with the candidate cardholder based at least partially upon a filing identifier and the cardholder profile of the candidate cardholder. Authentication computing device 106 further includes a transmitting component 608 configured to transmit an identity challenge to a user device associated with the candidate cardholder and/or to transmit an authentication status to the revenue computing device. Authentication computing device 106 further includes a determining component 610 configured to determine the authentication status based at least partially on a comparison of the response authentication data of the challenge response and the trusted authentication data of the cardholder profile.

In an exemplary embodiment database system 720 is divided into a plurality of sections, including but not limited to, a cardholder data section 622, a device data section 624, an account data section 626, and an authorization data section 628. These sections are interconnected through authentication computing device 106 to update and retrieve the information as required.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An authentication computing device communicatively coupled to a separate revenue computing device for processing electronic tax filings, the authentication computing device comprising:
    at least one processor in communication with a payment network; and
    a memory in communication with the at least one processor, wherein the memory stores instructions that, when executed by the at least one processor, cause the at least one processor to:
        store a cardholder profile associated with a candidate cardholder of a payment account associated with the payment network in a database system, wherein the cardholder profile includes a plurality of elements including a cardholder identifier, a device identifier, payment account data, and trusted authentication data associated with the candidate cardholder, wherein the trusted authentication data is provided by the candidate cardholder to be stored in the cardholder profile, the payment account data including an account identifier of the payment account of the candidate cardholder;
        receive, from the payment network, a first authentication request for a payment transaction, wherein the first authentication request includes the account identifier;
        retrieve the cardholder profile by matching the account identifier received in the first authentication request to the account identifier stored in the cardholder profile;
        in response to the first authentication request, transmit a first identity challenge to a user device associated with the device identifier of the cardholder profile of the candidate cardholder, wherein the first identity challenge requests authentication data associated with the candidate cardholder;
        receive a first challenge response including first response authentication data from the user device;
        compare the first response authentication data to the trusted authentication data of the cardholder profile;
        authenticate the first authentication request based on the comparison of the first response authentication data returning a match;
        determine a first authentication status for the first authentication request;
        transmit the first authentication status for the first authentication request to the payment network;
        authenticate the candidate cardholder for the payment transaction;
        receive, via an API call from the revenue computing device over a second network separate from the payment network, a second authentication request for an electronic submission to the revenue computing device of a tax filing of the candidate cardholder, wherein the second authentication request includes a filing identifier, and wherein the electronic submission of the tax filing is not processed by the payment network or the authentication computing device;
        in response to the second authentication request, query the database system using the filing identifier to match the filing identifier to at least one element included in the cardholder profile;
        in response to a match of the filing identifier and the at least one element, transmit a second identity challenge to the user device associated with the device identifier of the cardholder profile of the candidate cardholder, wherein the second identity challenge requests the authentication data associated with the candidate cardholder;
        receive a second challenge response including second response authentication data from the user device;
        compare the second response authentication data to the trusted authentication data of the cardholder profile;
        authenticate the second authentication request based on the comparison of the second response authentication data returning a match;
        determine a second authentication status for the second authentication request; and
        transmit the second authentication status for the second authentication request via the second network separate from the payment network to the revenue computing device.

2. The authentication computing device in accordance with claim 1, wherein the instructions further cause the at least one processor to:
    enroll the candidate cardholder in a payment authentication service using the cardholder profile;
    receive, from the revenue computing device, payment information associated with the tax filing, wherein the payment information includes at least one of the cardholder identifier or the account identifier;
    determine whether the payment information is associated with a cardholder enrolled in the payment authentication service; and
    notify the revenue computing device whether the candidate cardholder is enrolled based upon the determination.

3. The authentication computing device in accordance with claim 1, wherein the instructions further cause the at least one processor to:
    receive, in response to the second authentication status, a transaction request associated with the tax filing from the revenue computing device; and
    initiate a transaction associated with the tax filing using the payment account data of the cardholder profile in response to the transaction request.

4. The authentication computing device in accordance with claim 3, wherein the instructions further cause the at least one processor to:

transmit a transaction summary associated with the transaction request to the user device prior to initiating the transaction;
receive a transaction permission response from the user device in response to the transaction summary;
initiate the transaction when the transaction permission response indicates the transaction is approved; and
notify the revenue computing device that the transaction is declined when the transaction permission response indicates the transaction is declined.

5. The authentication computing device in accordance with claim 1, wherein the trusted authentication data includes trusted biometric authentication data of the candidate cardholder and the first and second identity challenges requesting biometric authentication data.

6. The authentication computing device in accordance with claim 1, wherein the instructions further cause the at least one processor to transmit the second authentication status to enable the revenue computing device to generate a verified tax filing based on the filing identifier,
the verified tax filing authenticating the candidate cardholder.

7. The authentication computing device in accordance with claim 1, wherein the instructions further cause the at least one processor to:
generate an authentication score based upon the comparisons of (a) the first response authentication data to the trusted authentication data of the cardholder profile, and (b) the second response authentication data to the trusted authentication data of the cardholder profile; and
compare the authentication score to at least one score threshold to authenticate the first and second authentication requests.

8. The authentication computing device in accordance with claim 1, wherein the first and second authentication requests include a revenue authentication result associated with a prior authentication for a prior tax filing, and wherein the receiving of the second authentication request via the API call comprises receiving the API call over the Internet via one of a web API and a socket connection.

9. A method for authenticating a tax filing associated with a candidate cardholder, the method implemented by an authentication computing device communicatively coupled to a separate revenue computing device for processing electronic tax filings, the authentication computing device including (i) at least one processor in communication with a payment network and (ii) a memory in communication with the at least one processor, the method comprising:
storing, by the authentication computing device, a cardholder profile associated with the candidate cardholder of a payment account associated with the payment network in a database system, wherein the cardholder profile includes a plurality of elements including a cardholder identifier, a device identifier, payment account data, and trusted authentication data associated with the candidate cardholder, wherein the trusted authentication data is provided by the candidate cardholder to be stored in the cardholder profile, the payment account data including an account identifier of the payment account of the candidate cardholder;
receiving, by the authentication computing device from the payment network, a first authentication request for a payment transaction, wherein the authentication request includes the account identifier;
retrieving, by the authentication computing device, the cardholder profile by matching the account identifier received in the first authentication request to the account identifier stored in the cardholder profile;
in response to the first authentication request, transmitting, by the authentication computing device, a first identity challenge to a user device associated with the device identifier of the cardholder profile of the candidate cardholder, wherein the first identity challenge requests authentication data associated with the candidate cardholder;
receiving, by the authentication computing device, a first challenge response including first response authentication data from the user device;
comparing, by the authentication computing device, the first response authentication data to the trusted authentication data of the cardholder profile;
authenticating, by the authentication computing device, the first authentication request based on the comparison of the first response authentication data returning a match;
determining, by the authentication computing device, a first authentication status for the first authentication request;
transmitting, by the authentication computing device, the first authentication status for the first authentication request to the payment network;
authenticating, by the authentication computing device, the candidate cardholder for the payment transaction;
receiving, by the authentication computing device via an API call from the revenue computing device over a second network separate from the payment network, a second authentication request for an electronic submission to the revenue computing device of the tax filing of the candidate cardholder, wherein the second authentication request includes a filing identifier, and wherein the electronic submission of the tax filing is not processed by the payment network or the authentication computing device;
in response to the second authentication request, querying the database system using the filing identifier to match the filing identifier to at least one element included in the cardholder profile;
in response to a match of the filing identifier and the at least one element, transmitting, by the authentication computing device, a second identity challenge to the user device associated with the device identifier of the cardholder profile of the candidate cardholder, wherein the second identity challenge requests authentication data associated with the candidate cardholder;
receiving, by the authentication computing device, a second challenge response including second response authentication data from the user device;
comparing, by the authentication computing device, the second response authentication data to the trusted authentication data of the cardholder profile;
authenticating, by the authentication computing device, the second authentication request based on the comparison of the second response authentication data returning a match;
determining, by the authentication computing device, a second authentication status for the second authentication request; and
transmitting, by the authentication computing device, the second authentication status for the second authentication request via the second network separate from the payment network to the revenue computing device.

10. The method in accordance with claim 9, wherein storing the cardholder profile further comprises:

enrolling the candidate cardholder in a payment authentication service using the cardholder profile;
receiving, from the revenue computing device, payment information associated with the tax filing, wherein the payment information includes at least one of the cardholder identifier or the account identifier;
determining, by the authentication computing device, whether the payment information is associated with a cardholder enrolled in the payment authentication service; and
notifying the revenue computing device whether the candidate cardholder is enrolled based upon the determination.

11. The method in accordance with claim 9 further comprising:
receiving, in response to the second authentication status, a transaction request associated with the tax filing from the revenue computing device; and
initiating a transaction associated with the tax filing using the payment account data of the cardholder profile in response to the transaction request.

12. The method in accordance with claim 11 further comprising:
transmitting, by the authentication computing device, a transaction summary associated with the transaction request to the user device prior to initiating the transaction;
receiving a transaction permission response from the user device in response to the transaction summary;
initiating the transaction when the transaction permission response indicates the transaction is approved; and
notifying the revenue computing device that the transaction is declined when the transaction permission response indicates the transaction is declined.

13. The method in accordance with claim 9, wherein the trusted authentication data includes trusted biometric authentication data of the candidate cardholder and the first and second identity challenges requesting biometric authentication data.

14. The method in accordance with claim 9, wherein transmitting the second authentication status further comprises enabling the revenue computing device to generate a verified tax filing based on the filing identifier,
the verified tax filing authenticating the candidate cardholder.

15. The method in accordance with claim 9 further comprising:
generating, by the authentication computing device, an authentication score based upon the comparisons of (a) the first response authentication data to the trusted authentication data of the cardholder profile, and (b) the second response authentication data to the trusted authentication data of the cardholder profile; and
comparing the authentication score to at least one score threshold to authenticate the first and second authentication requests.

16. The method in accordance with claim 9, wherein the first and second authentication requests include a revenue authentication result associated with a prior authentication for a prior tax filing, and wherein the receiving the second authentication request via the API call comprises receiving the API call over the Internet via one of a web API and a socket connection.

17. At least one non-transitory computer-readable storage medium having computer-executable instructions embodied thereon for execution by at least one processor of an authentication computing device, the authentication computing device communicatively coupled to a separate revenue computing device for processing electronic tax filings, the at least one processor of the authentication computing device in communication with a payment network, the computer-executable instructions cause the at least one processor of the authentication computing device to:
store a cardholder profile associated with a candidate cardholder of a payment account associated with a payment network in a database system, wherein the cardholder profile includes a plurality of elements including a cardholder identifier, a device identifier, payment account data, and trusted authentication data associated with the candidate cardholder, wherein the trusted authentication data is provided by the candidate cardholder to be stored in the cardholder profile, the payment account data including an account identifier of the payment account of the candidate cardholder;
receive, from the payment network, a first authentication request for a payment transaction, wherein the first authentication request includes the account identifier;
retrieve the cardholder profile by matching the account identifier received in the first authentication request to the account identifier stored in the cardholder profile;
in response to the first authentication request, transmit a first identity challenge to a user device associated with the device identifier of the cardholder profile of the candidate cardholder, wherein the first identity challenge requests authentication data associated with the candidate cardholder;
receive a first challenge response including first response authentication data from the user device;
compare the first response authentication data to the trusted authentication data of the cardholder profile;
authenticate the first authentication request based on the comparison of the first response authentication data returning a match;
determine a first authentication status for the first authentication request;
transmit the first authentication status for the first authentication request to the payment network;
authenticate the candidate cardholder for the payment transaction;
receive, via an API call from the revenue computing device over a second network separate from the payment network, a second authentication request for an electronic submission to the revenue computing device of a tax filing of the candidate cardholder, wherein the second authentication request includes a filing identifier, and wherein the electronic submission of the tax filing is not processed by the payment network or the authentication computing device;
in response to the second authentication request, query the database system using the filing identifier to match the filing identifier to at least one element included in the cardholder profile;
in response to a match of the filing identifier and the at least one element, transmit a second identity challenge to the user device associated with the device identifier of the cardholder profile of the candidate cardholder, wherein the second identity challenge requests authentication data associated with the candidate cardholder;
receive a second challenge response including second response authentication data from the user device;
compare the second response authentication data to the trusted authentication data of the cardholder profile;

authenticate the second authentication request based on the comparison of the second response authentication data returning a match;

determine a second authentication status for the second authentication request; and transmit the second authentication status for the second authentication request via the second network separate from the payment network to the revenue computing device.

18. The computer-readable storage medium in accordance with claim 17, wherein the computer-executable instructions further cause the at least one processor to:

enroll the candidate cardholder in a payment authentication service using the cardholder profile;

receive, from the revenue computing device, payment information associated with the tax filing, wherein the payment information includes at least one of the cardholder identifier or the account identifier;

determine whether the payment information is associated with a cardholder enrolled in the payment authentication service; and notify the revenue computing device whether the candidate cardholder is enrolled based upon the determination.

19. The computer-readable storage medium in accordance with claim 17, wherein the computer-executable instructions further cause the at least one processor to:

receive, in response to the second authentication status, a transaction request associated with the tax filing from the revenue computing device; and initiate a transaction associated with the tax filing using the payment account data of the cardholder profile in response to the transaction request.

20. The computer-readable storage medium in accordance with claim 19, wherein the computer-executable instructions further cause the at least one processor to:

transmit a transaction summary associated with the transaction request to the user device prior to initiating the transaction;

receive a transaction permission response from the user device in response to the transaction summary;

initiate the transaction when the transaction permission response indicates the transaction is approved; and notify the revenue computing device that the transaction is declined when the transaction permission response indicates the transaction is declined.

21. The computer-readable storage medium in accordance with claim 17, wherein the trusted authentication data includes trusted biometric authentication data of the candidate cardholder and the first and second identity challenges requesting biometric authentication data.

22. The computer-readable storage medium in accordance with claim 17, wherein the computer-executable instructions further cause the at least one processor to transmit the second authentication status to enable the revenue computing device to generate a verified tax filing based on the received tax filing identifier, the verified tax filing authenticating the candidate cardholder.

23. The computer-readable storage medium in accordance with claim 17, wherein the computer-executable instructions further cause the processor to:

generate an authentication score based upon the comparisons of (a) the first response authentication data to the trusted authentication data of the cardholder profile, and (b) the second response authentication data to the trusted authentication data of the cardholder profile; and compare the authentication score to at least one score threshold to authenticate the first and second authentication requests.

24. The computer-readable storage medium in accordance with claim 17, wherein the authentication request includes a revenue authentication result associated with a prior authentication for a prior tax filing, and wherein the receiving the second authentication request via the API call comprises receiving the API call over the Internet via one of a web API and a socket connection.

* * * * *